United States Patent
Takashima (10) Patent No.: US 8,625,144 B2
(45) Date of Patent: Jan. 7, 2014

(54) APPARATUSES AND METHODS FOR SWITCHING BETWEEN PRINTING APPARATUSES

(75) Inventor: Keiichi Takashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 12/696,206

(22) Filed: Jan. 29, 2010

(65) Prior Publication Data

US 2010/0195132 A1 Aug. 5, 2010

(30) Foreign Application Priority Data

Feb. 2, 2009 (JP) .................................. 2009-021947

(51) Int. Cl.
*G06K 15/00* (2006.01)

(52) U.S. Cl.
USPC ......... 358/1.16; 358/1.9; 358/1.13; 358/1.14; 358/1.15; 358/1.18; 713/1; 713/2; 713/100; 719/321; 709/221

(58) Field of Classification Search
None
See application file for complete search history.

(56) References Cited

U.S. PATENT DOCUMENTS

| | | | |
|---|---|---|---|
| 6,661,530 B1* | 12/2003 | Munetomo et al. .......... | 358/1.15 |
| 2005/0157315 A1* | 7/2005 | Kato .............................. | 358/1.1 |
| 2006/0072140 A1* | 4/2006 | Mitani ......................... | 358/1.13 |
| 2008/0180741 A1* | 7/2008 | Miyata ......................... | 358/1.15 |
| 2008/0307212 A1* | 12/2008 | Asano .............................. | 713/1 |
| 2009/0109487 A1* | 4/2009 | Tsukada ...................... | 358/1.16 |
| 2009/0147290 A1* | 6/2009 | Tomita ........................... | 358/1.9 |

FOREIGN PATENT DOCUMENTS

| | | |
|---|---|---|
| JP | H8-147118 A | 6/1996 |
| JP | 09-146731 A | 6/1997 |
| JP | 2009-015798 A | 1/2009 |

OTHER PUBLICATIONS

Office Action for Counterpart Japanese Application No. 2009-021947, dated Dec. 18, 2012.

* cited by examiner

*Primary Examiner* — Miya J Cato
(74) *Attorney, Agent, or Firm* — Carter, DeLuca, Farrell & Schmidt LLP (57) ABSTRACT

A storage medium for storing a program that switches a plurality of printing apparatuses by changing a port of a logical printer for printout and is executed by a computer having a storage unit configured to associate the port with device settings for storing it, the computer comprising a reflecting unit configured to acquire the stored device settings corresponding to the changed port to reflect the stored device settings in the device settings held by the logical printer if the port is changed; and a changing unit configured to change print settings so as not to be inconsistent with the device settings to be reflected by the reflecting unit.

7 Claims, 11 Drawing Sheets

APPARATUSES AND METHODS FOR SWITCHING BETWEEN PRINTING APPARATUSES

BACKGROUND OF THE INVENTION

1. Field of the Invention

The present invention relates to a storage medium that stores a program for switching a printing apparatus which executes printing, a print control apparatus, and a print control method.

2. Description of the Related Art

In many OSs (Operation Systems) such as Windows (registered trademark) by Microsoft Corp. and Mac OS (registered trademark) by Apple Inc., a printer driver mechanism is available for controlling a printing apparatus from application software. When a user installs a printer driver, which corresponds to the model of a printing apparatus for printout, on the OS, the printing apparatus can provide a printout from any application software corresponding to the printing I/F (interface) of the OS.

In general, a plurality of printer drivers can be installed on the same OS simultaneously, and a plurality of printing apparatuses can be controlled without restarting the application software. Conventionally, the printer drivers are available for each model of the printing apparatus. Naturally, by using a correct printer driver corresponding to the printing apparatus, printing can be carried out correctly and model-specific functions can be used. However, in a system having several types of printing apparatuses that have been introduced into an office environment, a system administrator manages all printer drivers that are independently installed by each client, resulting in a great burden on the system administrator.

An example of a burden on the system administrator includes an operation validation by installing/uninstalling a printer driver. In other words, when a part of the printing apparatuses is switched to a new model, the system administrator is to validate whether a trouble occurs in the operation of the existing printer driver when a printer driver for a new printer model is additionally installed on the OS on which a printer driver for a different printer model has already been installed. Installation into a system cannot be decided as long as no trouble in the operation of the existing printer is validated. Also, when the operation screen is different for each printer driver, a system operation manual directed to a user is to be updated.

In order to reduce such a burden on the system administrator, a printer driver referred to as generic printer driver (or universal printer driver) has been developed. The generic printer driver is characterized in that it does not correspond to model-specific special functions but corresponds to general functions and broader models. By using the generic printer driver, the printer driver to be installed by each client can be combined into a single type. As a result, there is no need to worry about the occurrence of any trouble due to the installation of a plurality of printer drivers. Furthermore, in the case of a model change, the printer driver already installed hitherto can be used as is.

Such a generic printer driver also improves the printing environment on a mobile PC (Personal Computer). For example, consider the case where an employee who comes and goes between a plurality of offices makes a printout on a printing apparatus connected to the office's network from a notebook PC that which the employee carries. Conventionally, different types of printer drivers are installed at different offices for separate use. However, it is cumbersome to properly select and use a driver from a plurality of printer drivers.

Thus, when the generic printer driver is used, a single printer driver can switch a printing apparatus of a port for printout. For example, the Universal Printer Driver by Hewlett-Packard Company displays the setting screen for each print job so as to specify the output printer.

However, print settings is to be reset so as not to use the functions which the printing apparatus does not have, whenever the printing apparatus to be output is switched. For example, when the printing apparatus is switched from a printing apparatus having a stapling function to a printing apparatus not having the stapling function, the stapling function is to be reset to "OFF". Otherwise, a print control command and a drawing command, which are incompatible with the printing apparatus, may be executed, resulting in printing errors and unintended print results.

Thus, a technique to switch print settings for solving these situations has been proposed (e.g., see Japanese Patent Laid-Open No. 8-147118). In this technique, print setting information, which has been initialized for each application software, is firstly registered for each application name. Then, when a printer driver is activated by a print request instruction from that application, if the application name has already been registered, the registered print setting information is invoked so as to display the print setting screen. If the application name has not been registered, the default print setting information is displayed on the print setting screen. By applying this technique to the printing apparatus, the print settings, which have been initially set for each printing apparatus, can be invoked for printout.

However, in the technique disclosed in Japanese Patent Laid-Open No. 8-147118, print setting information, which has been set before switching the printing apparatus for printout, may be deleted, thereby causing the situation in resetting the initially-registered print settings back to its original print settings.

Not only print settings but also settings (hereinafter referred to as "device settings") to be performed for each device, such as optional equipment configuration connected to the printing apparatus and various passwords is to be reset for each switch of the apparatus to be output. Although optional equipment configuration can be automatically reset when a configuration information acquire function is used, the load on the network and the printing apparatus may increase, and such configuration information may not be acquired when the network carries out one-way communication. In addition, a security situation may arise if a password can be readily acquired from the printing apparatus. Hence, in general, a password cannot be acquired from the printing apparatus.

The present invention is directed to enable the output destination printing apparatus to be switched in a smooth manner without requiring any laborious setting of the printing apparatus when the printing apparatus to be output is switched.

SUMMARY OF THE INVENTION

The present invention provides a storage medium for storing a program that switches a plurality of printing apparatuses by changing a port of a logical printer for printout and is executed by a computer having a storage unit configured to associate the port with device settings for storing it, the storage medium that stores the program for the functioning of the computer includes a reflecting unit configured to acquire the stored device settings corresponding to the changed port to reflect the stored device settings in the device settings held by the logical printer if the port is changed; and a changing unit configured to change print settings so as not to be inconsistent with the device settings to be reflected by the reflecting unit.

Further features of the present invention will become apparent from the following description of exemplary embodiments with reference to the attached drawings.

DESCRIPTION OF THE EMBODIMENTS

Hereinafter, the best mode for carrying out the invention will now be described with reference to the accompanying drawings.
(First Embodiment)
<System Configuration>

Figure 1:
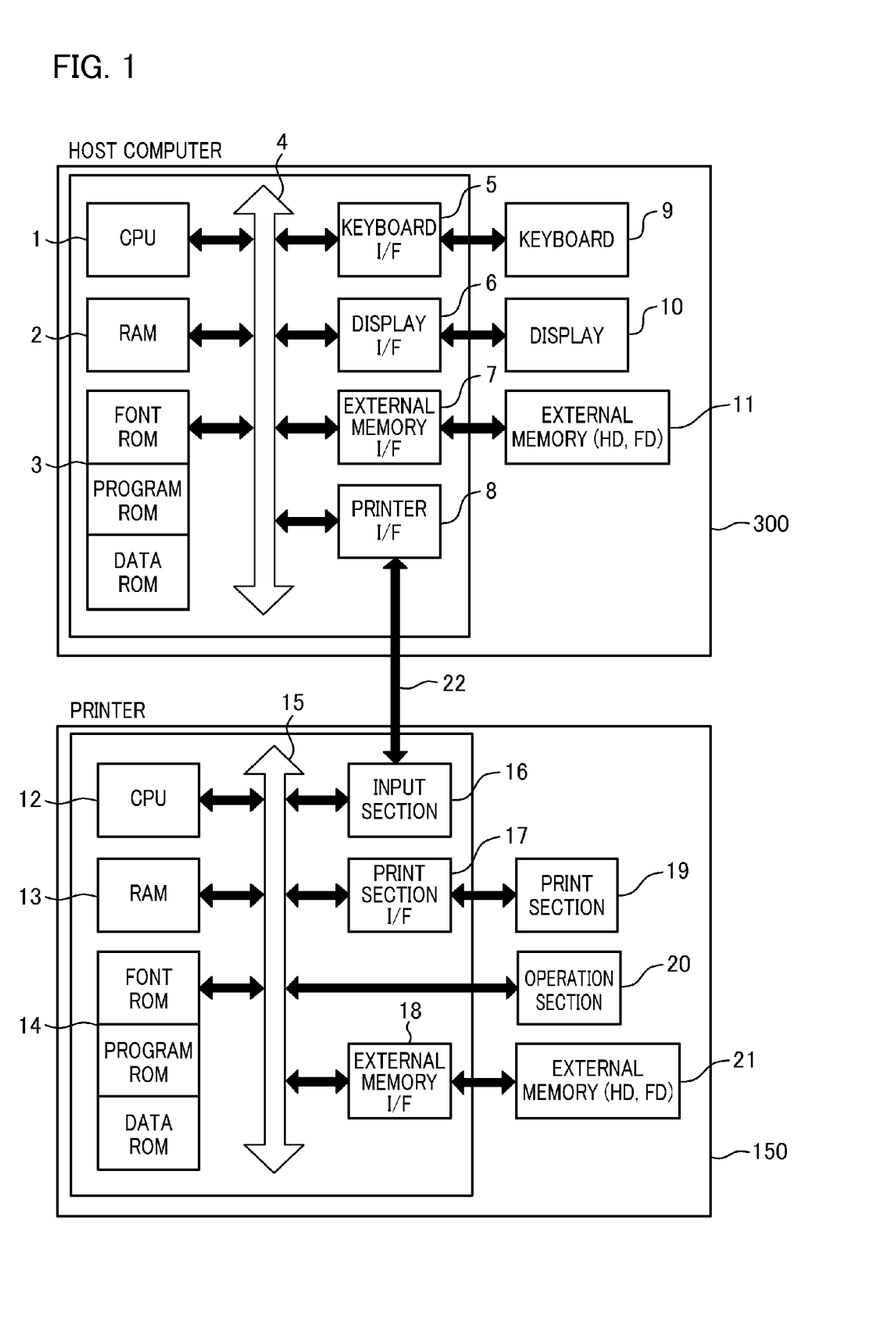
FIG. 1 is a view showing a configuration of a printing system including the print control apparatus according to the first embodiment.

FIG. 1 is a view showing a configuration of a printing system including the print control apparatus according to the first embodiment. The printing system includes a printer 150 (printing apparatus) that executes print processing, and a host computer 300 (print control apparatus) that controls the printer 150. The OS used in the present embodiment shall be compliant with the printing system for Windows (registered trademark) by Microsoft Corp. Unless otherwise specified, it goes without saying that the present invention can be applied within the scope that can achieve the purpose of the present invention. More specifically, although the printer 150 and the host computer 300 are merely shown in FIG. 1 for reasons of space limitation, the respective equipment can be provided in plural number. The printing system may also be a system in which the respective equipment is mutually connected through a network such as LAN, WAN, or the like for processing.

In FIG. 1, the host computer 300 includes a CPU 1 that executes image processing on documents including a combination of graphics, images, characters, tables (including spreadsheets), and the like on the basis of a document processing program and the like stored in a program ROM constituting a ROM 3 or an external memory 11. Furthermore, the CPU 1 integrally controls each of the devices connected to a system bus 4.

The program ROM constituting the ROM 3 or the external memory 11 stores an operating system (hereinafter referred to as "OS"), which is the control program of the CPU 1, or the like. A font ROM constituting the ROM 3 or the external memory 11 stores font data or the like to be used for performing the document processing described above. A data ROM constituting the ROM 3 or the external memory 11 stores various data to be used for the image processing described above, or the like.

A RAM 2 functions as a main memory, a work area, or the like of the CPU 1. A keyboard I/F (interface) 5 controls the key input from a keyboard 9 and a pointing device (not shown). A display I/F 6 controls the display of a display 10. An external memory I/F 7 controls the access to and from the external memory 11 such as a hard disc (HD), a flexible disc (FD), or the like. The external memory 11 stores a boot program, various applications, font data, user files, edit files, printer drivers for realizing functionalities shown in FIG. 2 to be described below, and the like. A printer I/F 8 is connected to the printer 150 through a predetermined bi-directional interface 22 to execute communication control processing with the printer 150.

The CPU 1 executes, for example, outline-font expansion (rasterization) processing into a display information RAM, which is set in the RAM 2, and provides WYSIWYG (what you see is what you get) on the display 10. Also, the CPU 1 opens various registered windows, and executes various data processing based on the commands instructed by a mouse cursor (not shown), or the like, on the display 10.

When printing application-generated information, a user opens a user interface for configuring settings to the information on the display 10, and the user performs the settings for the printer 150 and a selection of print mode. At this time, the user can carry out the settings of various print processing methods through the user interface provided by the printer driver.

On the other hand, the printer 150 also controls each of the devices provided therein. The CPU 12 outputs an image signal as output information to a print section (printer engine) 19 connected to a system bus 15 through a print section I/F 17 based on the control program and the like stored in a program ROM constituting a ROM 14 or the control program and the like stored in an external memory 21. The program ROM constituting the ROM 14 stores a control program and the like of the CPU 12. A font ROM constituting the ROM 14 stores font data and the like to be used when the above-described output information is generated. Also, a data ROM constituting the ROM 14 stores information and the like to be used in a host computer when a printer does not have the external memory 21 such as a hard disk or the like.

The CPU 12 is capable of performing bi-directional communication processing with the host computer 300 through an input section 16, and is capable of notifying the host computer 300 about information and the like in the printer 150. Here, information includes a printer engine status, network setting information, device name, resource name, and the like. A RAM 13 functions as a main memory, a working area, and the like of the CPU 12, and the memory capacity thereof can be expanded by an optional RAM connected to an expansion port (not shown). In this regard, the RAM 13 is used for an output information expansion area, environment data storage area, an NVRAM (Non-Volatile RAM), and the like.

The external memory 21 such as a hard disk (HD), an IC card, or the like is access-controlled by an external memory I/F 18. The external memory 21 is connected as an option, and stores font data, an emulation program(s), and the like. Note that the external memory 21 is not limited to a single device. At least one or more of the external memories 21 may be included, and a plurality of optional font cards and external memories storing programs which interpret printer control languages for different language systems may be connected in addition to the internal fonts.

Furthermore, the printer 150 may include an NVRAM, and printer-mode setting information from an operation section 20 may be stored there. A switch, an LED display, and the like for use in operation are disposed in the operation section 20.

<Function of Host Computer>

Figure 2:
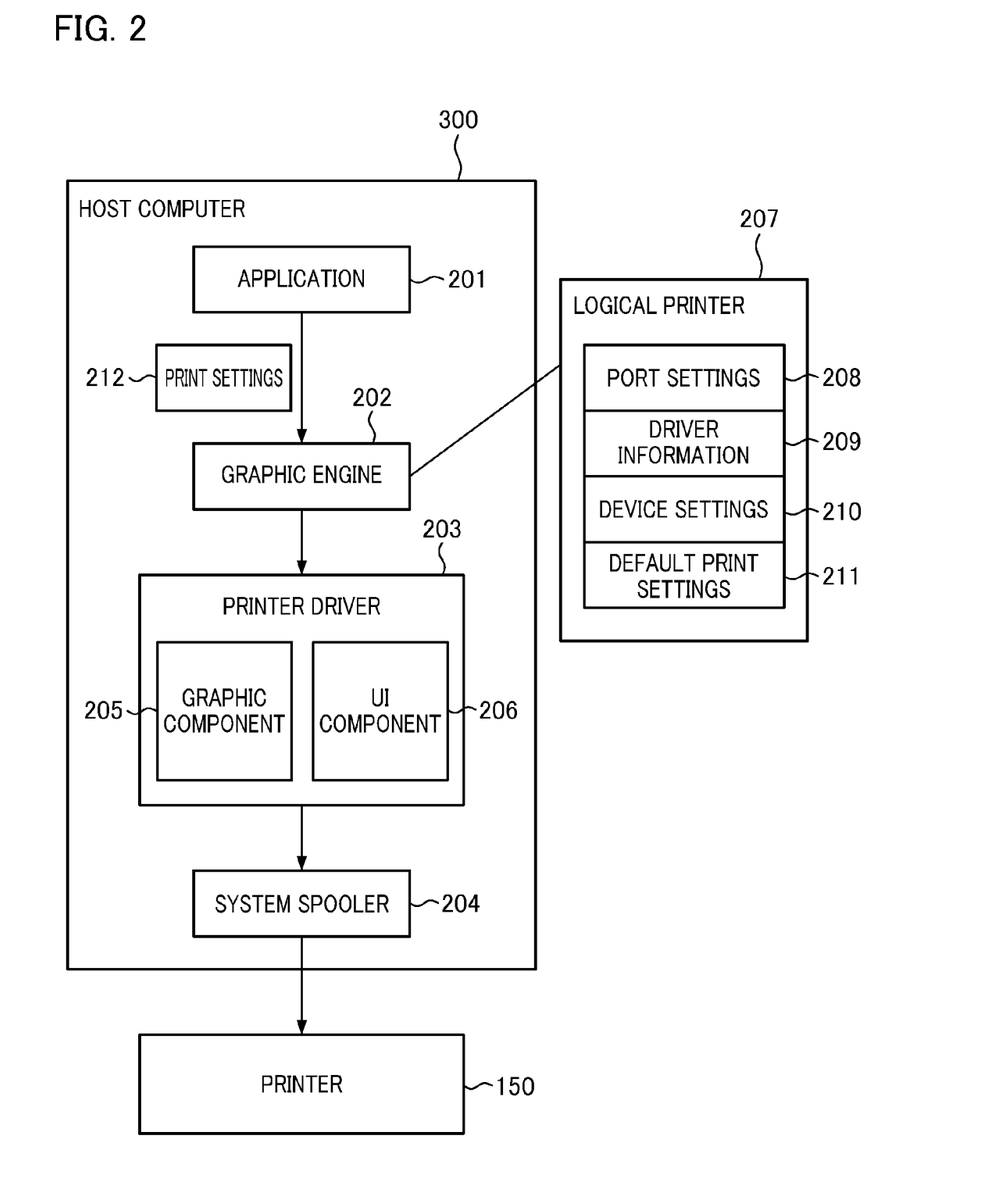
FIG. 2 is a block diagram showing the functional structure of a host computer 300.

FIG. 2 is a block diagram showing the functional structure of the host computer 300. In the present embodiment, the CPU 1 executes a program module to be described below to perform various print processes. Components having functions equivalent to those in FIG. 1 are represented by the same reference numerals.

In FIG. 2, an application 201, a graphic engine 202, a printer driver 203, and a system spooler 204 are present as files stored in the external memory 11. These are program modules that are loaded into the RAM 2 by the module itself using an OS and the module, and they are executed by the CPU 1.

The application 201 and the printer driver 203 can be stored in a hard disc (HD) that functions as the external memory 11 through a FD, a CD-ROM (not shown), or a network (not shown). The application 201 stored in the external memory 11 is loaded into the RAM 2 and executed by the CPU 1. Note that the application 201 and the printer driver 203 may be installed in the external memory 11 after the download from a server apparatus (not shown) to the host computer 300 through a network.

When printing is performed from the application 201 to the printer 150, output (drawing) is performed by using the graphic engine 202 which has been loaded into the RAM 2 and which has become executable.

The graphic engine 202 manages a plurality of logical printers 207. The logical printer refers to a virtual output destination of print data specified by the application 201. The logical printer 207 holds port settings 208, driver information 209, device settings 210, default print settings 211, and the like.

The port settings 208 includes information regarding the name and the type of the interface 22 (port) connected to the printer 150. There are several types of ports, such as serial ports, parallel ports, USB ports, TCP/IP ports, and each port is attached to a port name which is capable of unique identification, such as COM1, LPT1, USB001, or 192.168.0.1.

Figure 3:
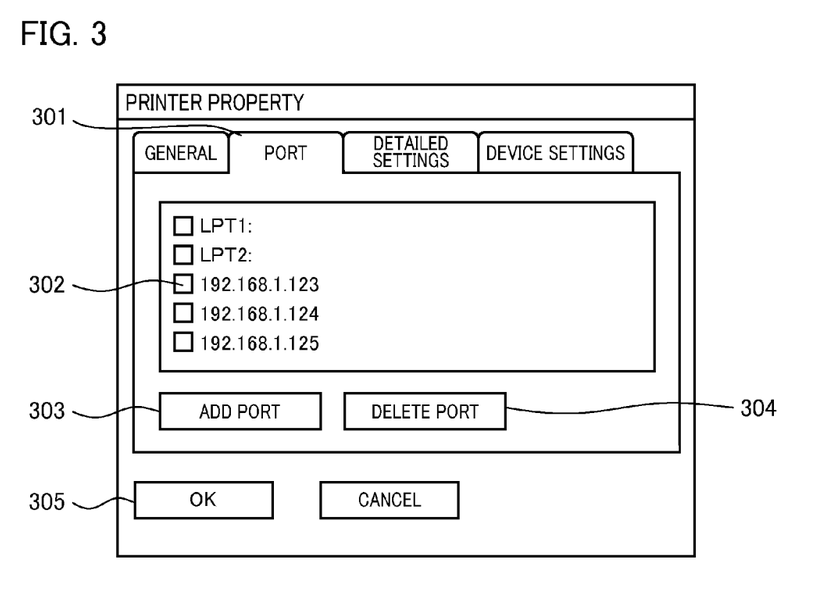
FIG. 3 is a diagram showing an example of a port setting screen.

FIG. 3 is a diagram showing an example of a port setting screen. This port setting screen is displayed, for example, on the display 10. In FIG. 3, when the printer property of the logical printer 207 is displayed and the port tab 301 is selected, this port setting screen is displayed. The port to be connected to the printer 150 is set by selecting any one of port names from the port list 302. When an operator wants to connect to a port not present on the list, the operator pushes an add port button 303, an add port screen (not shown) is displayed, and the port can thereby be added on the list. When the operator pushes a delete port button 304, the selected port can be deleted from the list. Finally, the operator specifies the port, pushes an OK button 305, and the port settings are thereby established.

The driver information 209 includes information such as the driver name and driver version that can uniquely specify the printer driver 203 to be used.

The device settings 210 denote setting information unique to the printer 150 which is the output destination, and include information such as optional equipment configuration that is obtainable from the printer 150 and information such as a password that is not obtainable from the printer 150.

Figure 4:
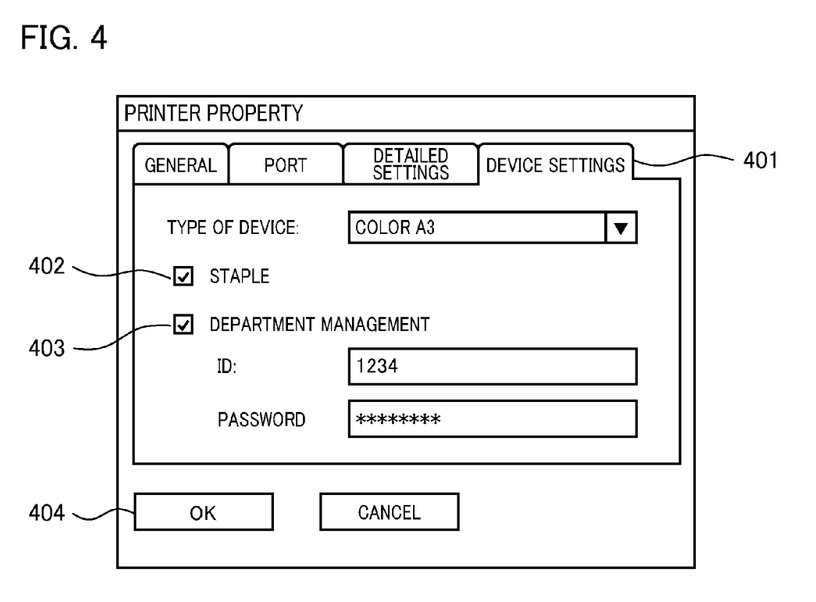
FIG. 4 is a diagram showing an example of a device setting screen.

FIG. 4 is a diagram showing an example of a device setting screen. This device setting screen is also displayed on the display 10. In FIG. 4, when the printer property of the logical printer 207 is displayed and the port tab 401 is selected, this port setting screen is displayed. Here, a device option is set by checking a staple check box 402. Also, the ID and password settings dependent on a predetermined device are performed by checking a department management setting box 403. After various settings are completed, the operator pushes an OK button 404, and the device settings are thereby established. Note that the device settings are set in advance before the application 201 executes print processing.

The default print settings 211 are the initial values for print settings to be used by the application 201. The application 201 acquires the default print settings 211, and passes print settings 212, which have been changed appropriately depending on print processing conditions to be performed, to the graphic engine 202. By setting the default print settings 211 to be used as the normally used settings, the task of changing the default print settings 211 by the application 201 each time can be eliminated.

Also, the consistency of the default print settings 211 with the changed device settings 210 is checked by the printer driver 203 when the device settings 210 are changed. If inconsistent combinations of set values exist, the default print settings 211 are changed into set values that are consistent with each other. For example, when a device setting value is set such that a staple finisher is not connected, the print settings in a "staple ON" mode are inconsistent. Hence, the print settings are changed into a "staple OFF" mode after a consistency check. Changing to the set values that have been made consistent by performing a consistency check is also referred to as "rounding".

The application 201 specifies the logical printer 207 as the output destination during printing. Then, the graphic engine 202 refers to the driver information 209 of the specified logical printer 207 and determines the printer driver 203 to be used so as to load the printer driver 203 from the external memory 11 into the RAM 2. The output of the graphic engine 202 and the application 201 is set to the printer driver 203. In addition, the graphic engine 202 receives the print settings 212 or print data from the application 201, outputs it as print data to the printer driver 203.

The graphic component 205 of the printer driver 203 receives print data from the graphic engine 202, and converts print data into a control command recognizable by the printer 150, e.g., PDL (Page Description Language) data. The printer control command, which has been converted by the graphic component 205, passes through the system spooler 204 loaded by the OS to the RAM 2, and is output as print data to the printer 150 through the interface 22.

A UI (user interface) component 206 receives the print settings 212 from the graphic engine 202, displays and changes the print settings 212, and notifies the application 201 about the results through the graphic engine 202. The UI (user interface) component 206 is one of the modules of the printer driver 203.

<Outline of Print Control Processing>

Figure 5:
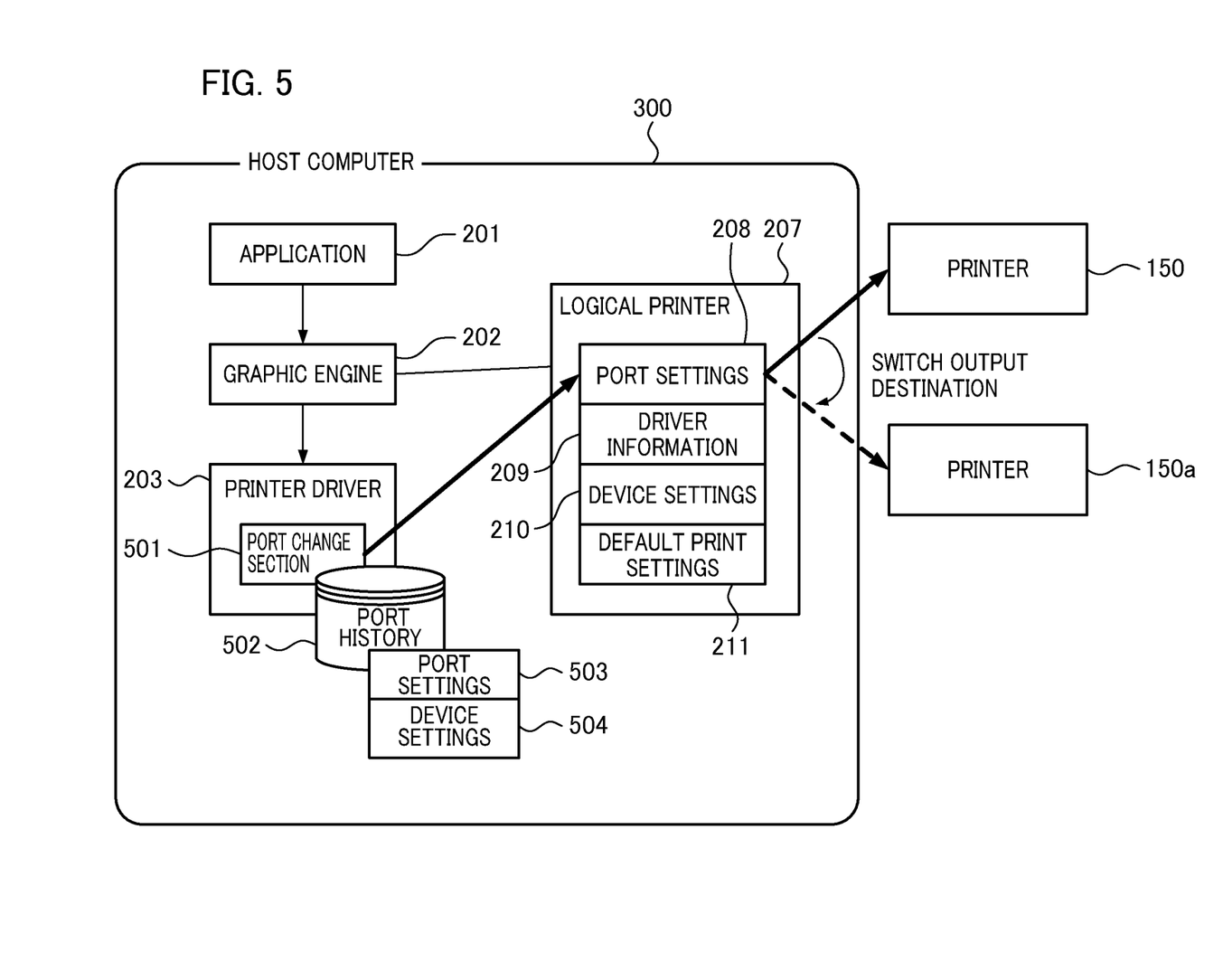
FIG. 5 is a view for explaining an outline of print control processing performed by the host computer 300.

Next, an outline of print control processing will be described. FIG. 5 is a view for explaining an outline of print control processing performed by the host computer 300. Components having functions equivalent to those in FIG. 2 are represented by the same reference numerals.

In the present embodiment, the printer driver 203 includes the port change section 501. When a user specifies the logical printer 207 from the application 201 to order printing, print data is output from the graphic engine 202 to the printer driver 203 corresponding to the driver information 209. When the printer driver 203 receives print data from the graphic engine 202, the port change section 501 displays the port setting screen shown in FIG. 3 on the display 10, and the user specifies the output destination. When the user specifies the change in output destination from the printer 150 to the printer 150a, the port change section 501 changes the port settings 208 of the logical printer 207. As a result, print data from the printer driver 203 is output to the printer 150a.

The port change section 501 stores a port history 502 in the RAM 2 (storage unit) for management. The port history 502 is composed of port settings 503 and device settings 504. The port settings 503 denote information equivalent to the port settings 208 of the logical printer 207. The device settings 504 denote information equivalent to the device settings 210 of the logical printer 207. Device settings corresponding to each port are stored. For example, port A stores the device settings corresponding to the device on the port A, and port B stores the device settings corresponding to the device on the port B. The port change section 501 stores the port settings 208 and the device settings 210 of the logical printer 207 in the form of a history when a port change is made. The stored port history 502 is read by the port change section 501 when the port is changed to the same port, and restores the device settings 504 to the device settings 210 of the logical printer 207. The restored device settings 210 may be inconsistent with the default print settings 211 that have already been set and the print settings 212 that have been passed to the printer driver 203. Hence, the port change section 501 checks their consistency. When inconsistent combinations of set values exist as a result of the consistency check, the restored device settings 210 are changed into set values that are consistent with each other. The port history 502 is held for each printer driver, and shared between the logical printers that are associated with the same printer driver. Hence, once a printing apparatus has been used as the output destination for a logical printer, such a printing apparatus can use the port history even if the printing apparatus has never been used as the output destination for the other logical printer.

<Detailed Configuration of Port Change Section 501>

Figure 6:
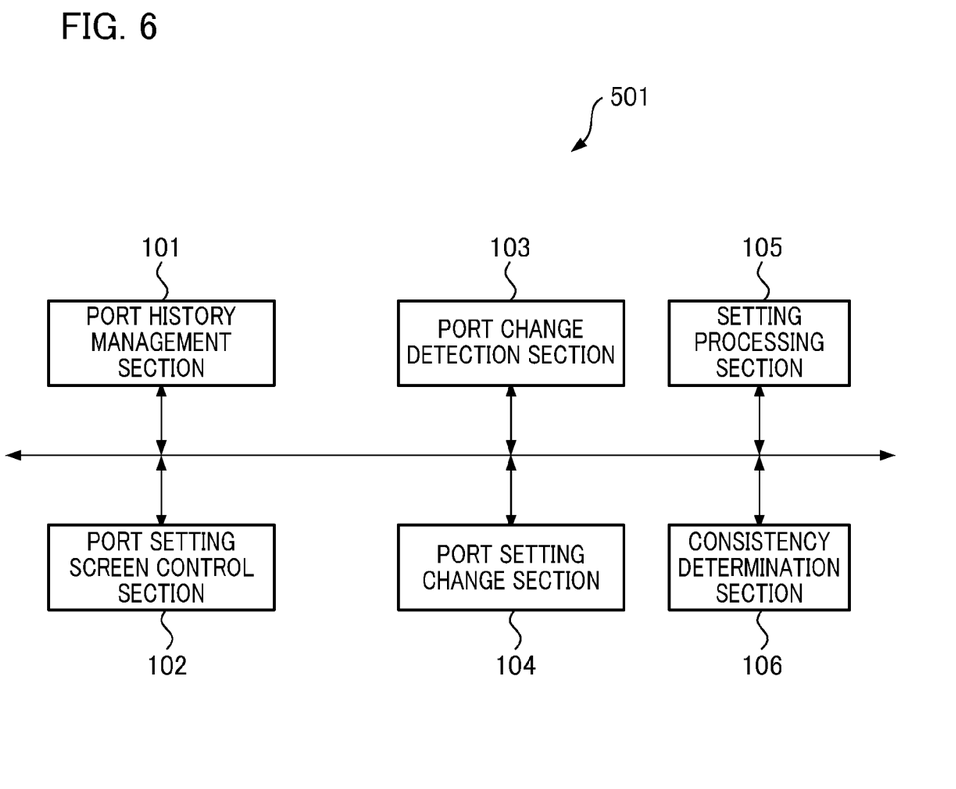
FIG. 6 is a block diagram showing the detailed configuration of a port change section 501.

Next, the detailed configuration of the port change section 501 will be described. FIG. 6 is a block diagram showing the detailed configuration of the port change section 501. The port change section 501 includes a port history management section 101, a port setting screen control section 102, a port change detection section 103, a port setting change section 104, a setting processing section 105, and a consistency determination section 106.

The port history management section 101 creates and updates port history. Also, the port history management section 101 stores the updated port history in a storage unit such as the RAM 2. Furthermore, the port history management section 101 performs a search of a port history to the storage unit and a determination of the presence or absence of the port history of interest. The port setting screen control section 102 displays the port setting screen (see FIG. 3) on the display 10, and receives any port change made by a user. The port change detection section 103 detects what kind of change has been made to the port settings on the port setting screen. The port setting change section 104 changes the port settings 208 of the logical printer 207, which is the virtual output destination of print data designated by the application 201, based on the detection results obtained by the port change detection section 103. The setting processing section 105 acquires the device settings 504 of the port history 502. The setting processing section 105 acquires information such as configuration information among the device settings that are obtainable from the printer 150. This is performed when the port history 502 was not found as a result of searching performed by the port history management section 101. Furthermore, the setting processing section 105 determines whether or not information relating to device settings has been acquired. When information relating to device settings has not been acquired, the setting processing section 105 acquires the defined value for the device settings of the printer driver 203. The setting processing section 105 overwrites (restores) the acquired device settings to the device settings 210 of the logical printer 207. The consistency determination section 106 checks the consistency between the overwritten device settings 210 and the print settings 212 passed to the printer driver 203 and the consistency between the overwritten device settings 210 and the default print settings 211. When the port change is performed at the start of printing described above, two consistency checks are performed. However, when the port change is not performed at the start of printing, the print settings 212, which have been passed to the printer driver 203, are not present. Hence, only the consistency between the overwritten device settings 210 and the default print settings 211 is checked.

<Procedure for Print Control Processing>

Next, the procedure for print control processing according to the present embodiment will be described in detail with reference to FIGS. 7 to 9.

Figure 7:
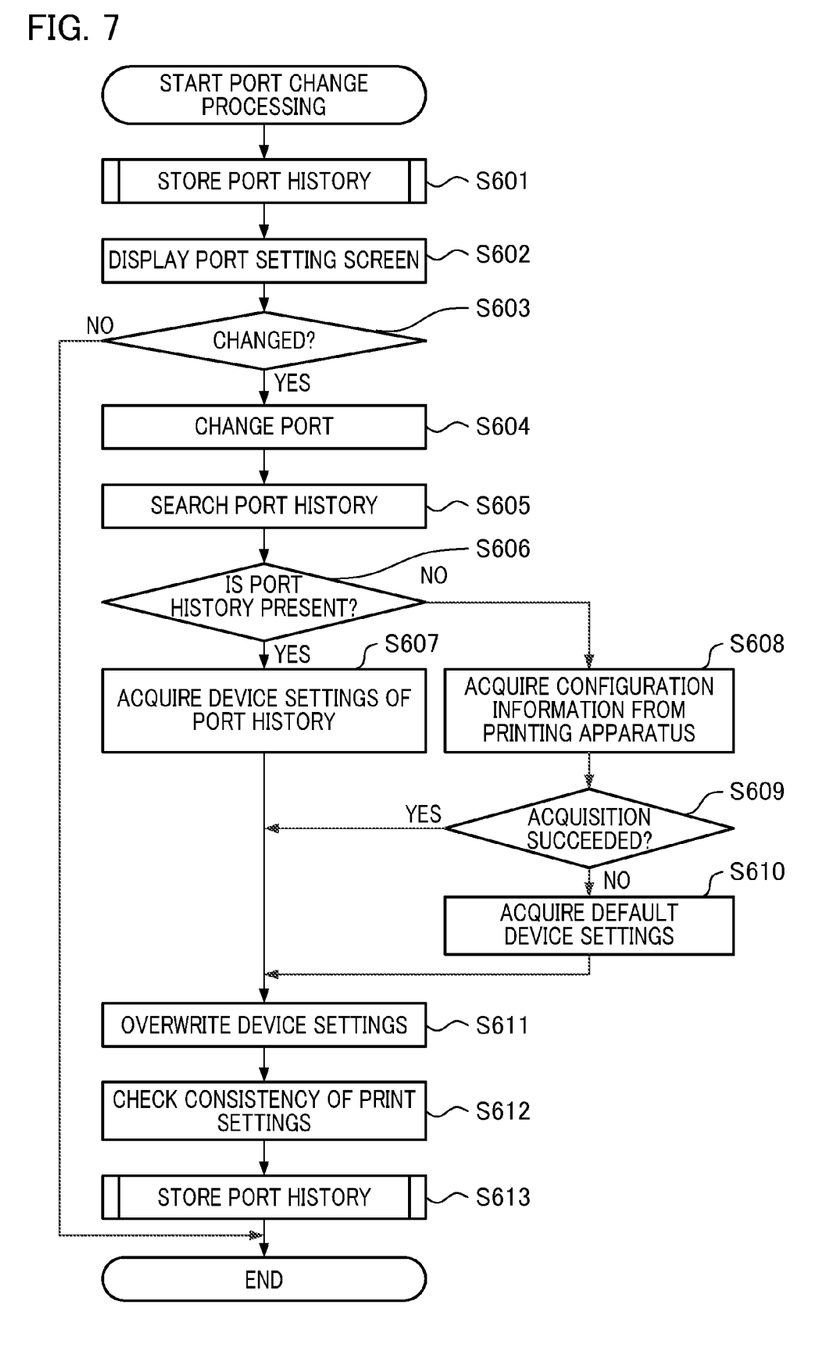
FIG. 7 is a flowchart diagram showing print control processing according to the first embodiment.

FIG. 7 is a flowchart diagram showing the procedure for print control processing according to the first embodiment. The program according to the flowchart shown in FIG. 7 is stored in the external memory 11, read by the RAM 2, and executed by the CPU 1. As shown in FIG. 7, first, a port history is stored (step S601). When the printer driver 203 receives print data, the port history management section 101 of the port change section 501 stores the port history with respect to the current port, i.e., pre-changed port in the RAM 2. In this way, the port history 502 in the current device settings 210 is created or updated. The detail of port history store processing will be described later.

Next, the port setting screen is displayed (step S602). Here, the port setting screen control section 102 displays the port setting screen (see FIG. 3) on the display 10. In this way, a user can specify the output destination.

Next, it is detected whether or not any port change instruction has been made (step S603). The port change detection section 103 detects whether or not any change instruction has been made after the port setting screen is closed, and detects what kinds of changes have occurred when change instruction has been made. Here, when any change instruction has not been made (No in step S603), port change processing is terminated, and the subsequent print processing is performed.

On the other hand, when a port change instruction has been made in step S603 (Yes in step S603), a port change is performed (step S604). Here, the port setting change section 104 changes the port settings 208 of the logical printer 207, which is the virtual output destination of print data specified by the application 201, based on the detection results performed by the port change detection section 103.

Next, a port history is searched (step S605). Here, the port history management section 101 starts search of the RAM 2 so as to detect whether or not the port history 502 corresponding to the changed port is present. Then, it is determined whether or not a port history is present (step S606). This processing is also executed by the port history management section 101. Here, if there exists a port history of interest (Yes in step S606), the device settings 504 corresponding to the port history 502 of interest is acquired (step S607). The device settings 504 is acquired by the setting processing section 105. Then, the process advances to step S611.

On the other hand, if there is no port history of interest in step S606 (No in step S606), configuration information is acquired from the printing apparatus (step S608). More specifically, the setting processing section 105 acquires information that is obtainable from the printing apparatus, such as configuration information that can be substituted as the device settings.

Next, it is determined whether or not information relating to the device settings has been successfully acquired (step S609). This determination is performed by the setting processing section 105. Here, if information has been successfully acquired (Yes in step S609), the process advances to step S611. On the other hand, if information has not been successfully acquired (No in step S609), the default device settings are acquired (step S610). Here, the setting processing section 105 acquires the device setting defined value of the printer driver 203. Then, the process advances to step S611.

Note that in step S608 or step S610, if information to be acquired, such as various passwords, cannot be acquired from the printing apparatus, the device settings are in a null state.

Then, the device setting is overwritten (step S611). More specifically, the setting processing section 105 overwrites the device settings, which have been acquired in any one of steps S607, S608, or S610, to the device settings 210 of the logical printer 207.

Then, the consistency of print settings is checked (step S612). Here, the consistency determination section 106 checks the consistency between the device settings 210 that have been overwritten by the process in step S611 and the print settings 212 that has been passed to the printer driver 203. Furthermore, the consistency determination section 106 checks the consistency between the device settings 210 that have been overwritten by the process in step S611 and the default print settings 211.

Finally, the port history is stored (step S613). Here, the port history management section 101 creates or updates the port history 502 based on the device settings 210 that have been overwritten by the process in step S611, and stores it. Step S613 is similar to step S601.

Next, port history store processing shown in FIG. 7 (step S601, step S613) will be described in detail. FIG. 8 is a flowchart diagram showing the procedure for port history store processing (step S601, step S613). The program according to the flowchart shown in FIG. 8 is stored in the external memory 11, read by the RAM 2, and executed by the CPU 1.

Figure 8:
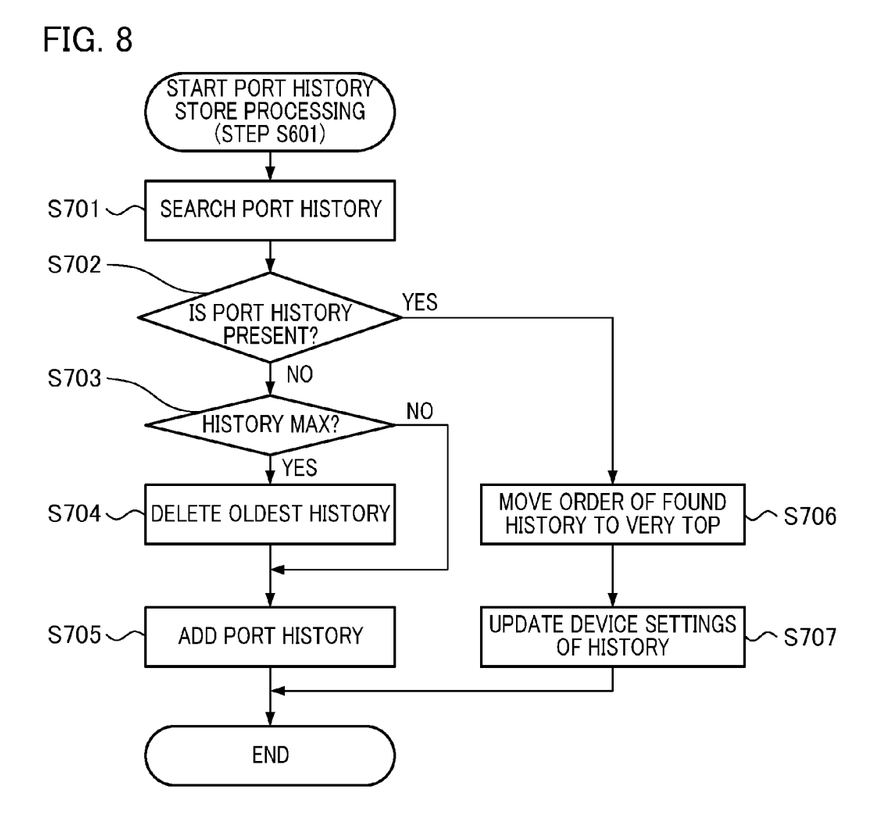
FIG. 8 is a flowchart diagram showing the procedure for port history store processing (step S601) according to the first embodiment.

In the flowchart shown in FIG. 8, first, a port history is searched (step S701). More specifically, the port history management section 101 starts checking whether or not a port history corresponding to the port to be updated is present among the plurality of port histories 502 that have already been stored in the RAM 2. Then, it is determined whether or not the port history is present (step S702). This processing is also executed by the port history management section 101. Here, if there is no port history of interest (No in step S702), it is determined whether or not the number of port histories has reached the maximum number (MAX) thereof (step S703). More specifically, the port history management section 101 determines whether or not the number of port histories has reached a predetermined maximum number thereof. Here, if the number of port histories has not reached the maximum number (MAX) thereof (No in step S703), the process advances to step S705. On the other hand, if the number of port histories has reached the maximum number (MAX) thereof (Yes in step S703), the oldest port history is deleted (step S704). This processing is also performed by the port history management section 101. Although this processing is performed to restrict the number of port histories such that the port history 502 is not added in infinitum, such a restriction may be made by other method such as the number of total bites.

Next, the port history is added (step S705). More specifically, the port history management section 101 copies the port settings 208 and the device settings 210 of the current logical printer 207 and creates the port history 502 for addition.

It should be noted that if the port history of interest has been found in step S702 (Yes in step S702), the order of the found port history 502 is moved to the top (newest) (step S706). Then, the device settings 504 of the port history 502 is updated so as to be equivalent to the device settings 210 of the current logical printer 207 (step S707). The processes in step S706 and step S707 are performed by the port history management section 101.

Next, a description will be given for processing when the device settings 210 are changed by a user. FIG. 9 is a flowchart diagram showing the procedure for the device setting change processing. The program according to the flowchart shown in FIG. 9 is stored in the external memory 11, read by the RAM 2, and executed by the CPU 1.

Figure 9:
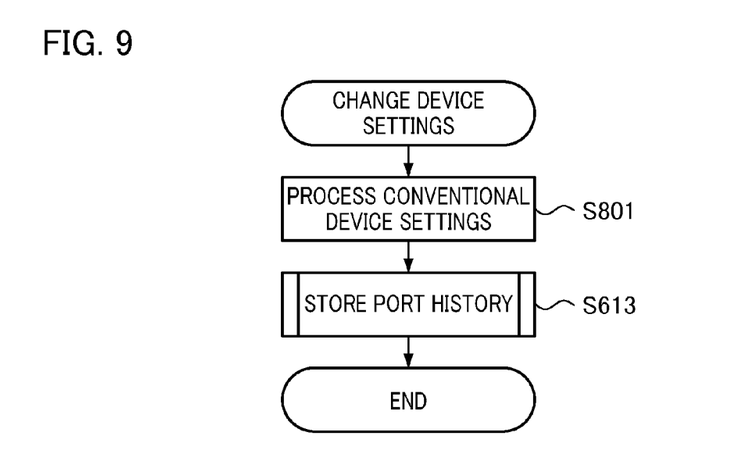
FIG. 9 is a flowchart diagram showing the procedure for device setting change processing according to the first embodiment.

In the flowchart shown in FIG. 9, first, a conventional device setting change is performed (step S801). More specifically, the setting processing section 105 changes the device settings 210 of the logical printer 207 using a conventional method. The Port history store processing shown in the flowchart of FIG. 7 (step S613) is performed. By being carried out in this way, when the device settings 210 have been changed from the other logical printer 207 which uses the same printer driver 203, the stored port history 502 can be quickly found by the process in step S605 shown in FIG. 7. Consequently, the stored port history 502 can be reflected in the device settings 210 by the process in step S607. Even when the device settings 210 are changed while a port change screen at the start of printing is displayed, a similar effect as that of the foregoing can be expected.

By executing the processing described above, the device settings 210 are automatically restored to the device settings of the printing apparatus that has previously been designated as the output destination, when the output destination of the logical printer is changed. Furthermore, the print settings are appropriately "rounded" in accordance with the restored device settings, which eliminates the need to conduct print settings again. Consequently, the output of the print control command and the drawing command, which are incompatible with the printing apparatus due to the change of the output destination, is eliminated, whereby loss of time due to failure of printing and loss of paper due to an unintended print result can be eliminated.

In the present embodiment, a password for department management, which cannot be acquired in one-way communication network or from the printing apparatus, can also be restored. Furthermore, when a logical printer is created by the same printer driver, the same port history can be used immediately after creation, output processing at the printing apparatus of the switched destination can be performed smoothly.

(Second Embodiment)

Although the first embodiment has been described through the example in which a port is changed during print processing of the printer driver 203, the port may be changed before printing. For example, a port may be changed from being dedicated to property of the logical printer 207. When a port is changed during print processing, the port is changed only one time. When a port is changed before printing, it is contemplated that port is changed several times in succession. In this case, even though a user does not change the default print settings 211 of the logical printer 207, there arises a situation in that set values are gradually rounded only by changing a port. Hereinbelow, a trouble arising in the course of such a port change will be described.

Figure 10:
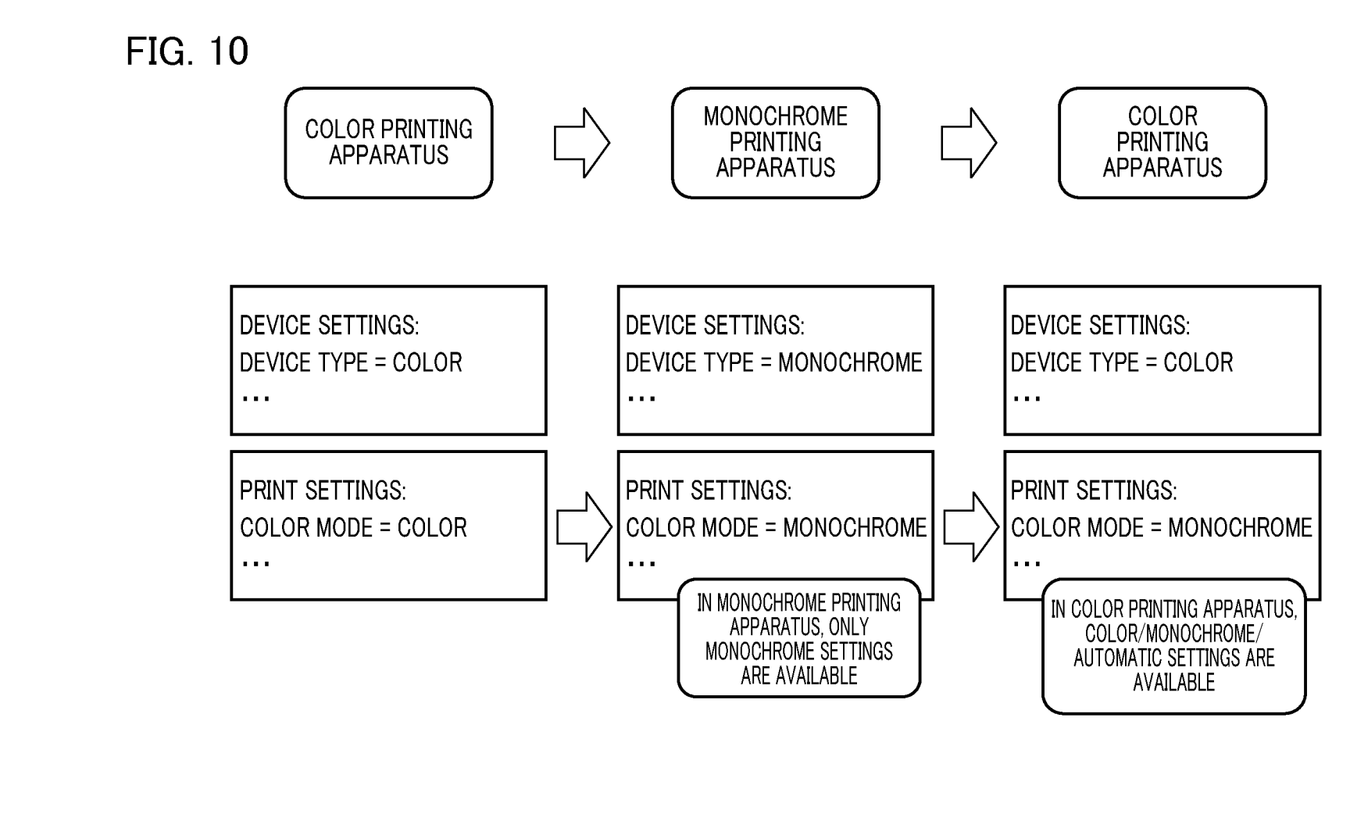
FIG. 10 is a view for illustrating a trouble occurring during port change.

FIG. 10 is a view for illustrating trouble that may occur during a port change. In FIG. 10, a description will be given of an example in which device settings of "device type", which indicates a color printing apparatus or a monochrome printing apparatus, and print settings of a "color mode", which indicates color printing or monochrome printing, are available.

First, assume that port is a color printing apparatus, the device type of the device settings 210 is set to color, and the color mode of the default print settings 211 is set to color. When a port is changed to a monochrome printing apparatus, the device type of the device settings is restored to monochrome from the port history, and the color mode becomes monochrome as a result of the consistency check. Then, when a port is changed to the color printing apparatus again without changing the default print settings 211, the device type of the device settings is restored to color. Even if the consistency check is performed, the color mode remains as monochrome because the color printing apparatus can also perform monochrome printing. In other words, when a port is changed to various different printing apparatuses, there arises a situation in that the default print settings 211 are gradually rounded even if a user does not change it. In order to resolve these situations, the following processing is executed in the present embodiment.

Figure 11:
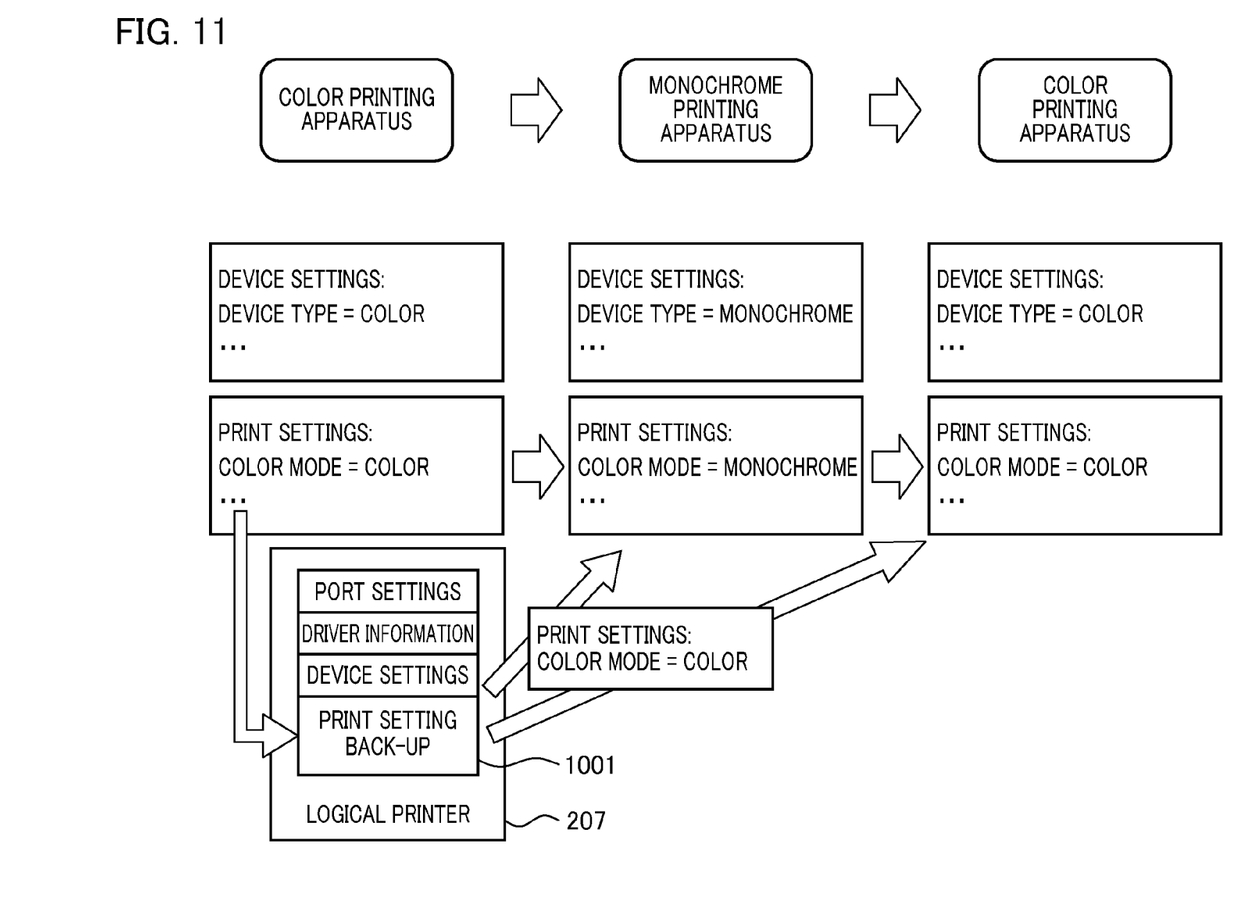
FIG. 11 is a view for explaining an outline of print control processing according to the second embodiment.

FIG. 11 is a view for explaining an outline of print control processing according to the second embodiment. As shown in FIG. 11, to resolve the above situations, a print setting back-up 1001, which is a copy of the default print settings 211 that have been changed by a user operation, is created to be held in the logical printer 207. For example, this processing be carried out by the setting processing section 105 shown in FIG. 7. When a port is changed, its consistency with the device settings should be checked on the basis of the print setting back-up 1001, not the current default print settings 211. By being carried out in this way, even when only a port is changed without changing the default print settings 211, the default print settings 211 are not gradually rounded, and are rounded only against the default print settings 211 that have been set by a user.

<Procedure for Print Control Processing>

Figure 12:
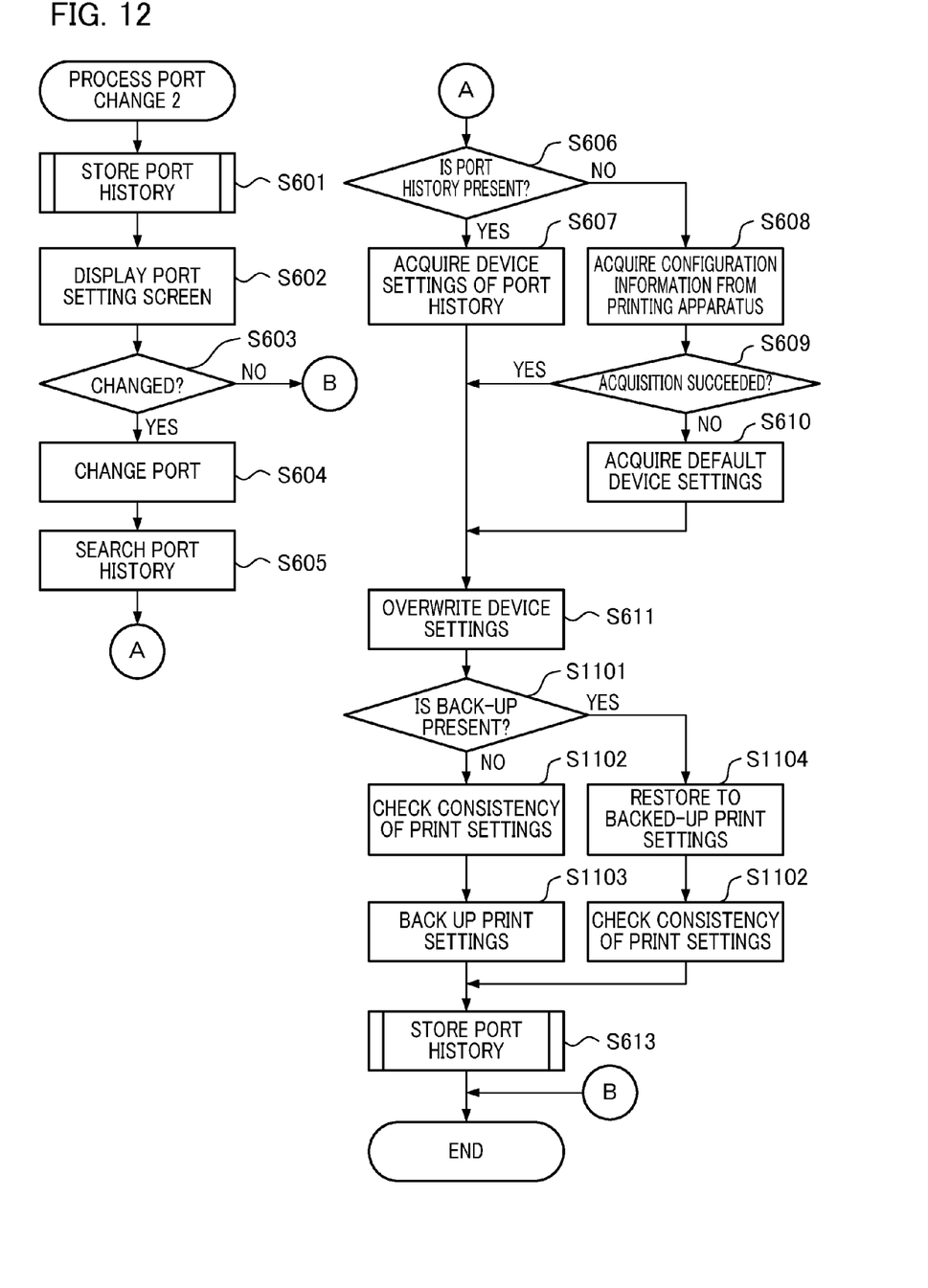
FIG. 12 is a flowchart diagram showing the procedure for print control processing according to the second embodiment.

Next, the procedure for print control processing according to the present embodiment will be described. FIG. 12 is a flowchart diagram showing the procedure for print control processing according to the second embodiment. The program according to the flowchart shown in FIG. 12 is stored in the external memory 11, read by the RAM 2, and executed by the CPU 1. In FIG. 12, the processes in steps S601 to step S611 and the process in step S613 are the same as those shown in FIG. 7. It differs in that instead of the process for checking the consistency of print setting in FIG. 7 (step S612), the processes in steps S1101 to S1104 in the following are added.

In the following, a description will be made regarding the processes in steps S1101 to S1104 only.

In the flowchart shown in FIG. 12, it is determined whether or not a print setting back-up is present after the process in step S611 is conducted (step S1101). Here, the print setting back-up 1001 is not present if a print setting change by a user operation and a port change from the printer property of the logical printer 207 has not been made after the creation of the logical printer 207. In step S1101, the setting processing section 105 shown in FIG. 6 determines whether or not the print setting back-up 1001 is present in the logical printer 207. Here, if there is no print setting back-up (No in step S1101), the consistency of print settings is checked (step S1102). More specifically, the consistency determination section 106 shown in FIG. 6 checks the consistency between the current device settings 210 of the logical printer 207 and the default print settings 211 of the logical printer 207 and the consistency between the current device settings 210 of the logical printer 207 and the print settings 212 passed to the printer driver. Next, the print settings are backed up (step S1103). Here, the setting processing section 105 copies the default print settings 211 after consistency check processing performed at step S1102, and creates the print setting back-up 1001 to store it in the logical printer 207. Then, the process advances to step S613.

On the other hand, if the print setting back-up is present in step S1101 (Yes in step S1101), the print settings are restored to those of the print setting back-up (step S1104). More specifically, the setting processing section 105 overwrites the print setting back-up 1001 and copies it to the default print settings 211. Then, the consistency of the print settings is checked (step S1102). Here, the consistency determination section 106 checks the consistency between the device settings 210 of the logical printer 207 and the default print settings 211 of which the print setting back-up 1001 has been overwritten and the consistency between the device settings 210 of the logical printer 207 and the print settings 212 passed to the printer driver. Then, the process advances to step S613.

Figure 13:
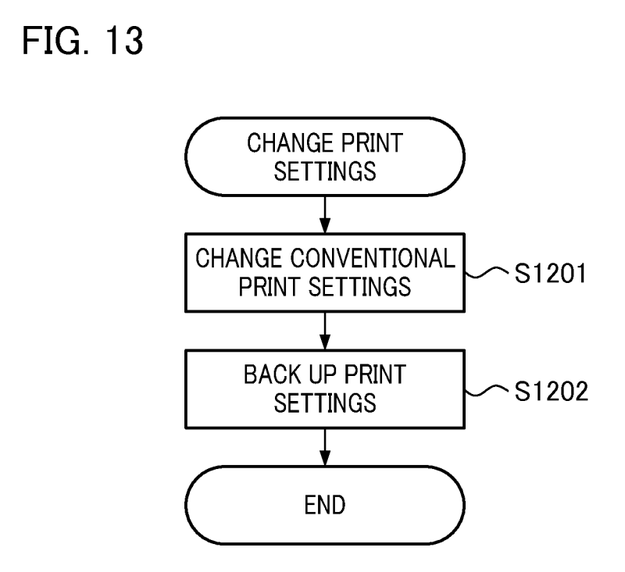
FIG. 13 is a flowchart diagram showing the procedure for print setting change processing according to the second embodiment.

Next, a description will be given regarding a processing when the default print settings 211 are changed by a user. FIG. 13 is a flowchart diagram showing the procedure for print setting change processing according to the second embodiment. The program according to the flowchart shown in FIG. 13 is stored in the external memory 11, read by the RAM 2, and executed by the CPU 1. In the flowchart shown in FIG. 13, first, a conventional device setting change is performed (step S1201). More specifically, the setting processing section 105 changes the default print settings 211 using the conventional method. Next, the print setting is backed up (step S1202). More specifically, the setting processing section 105 stores a copy of the default print settings 211 that have been changed by the process in step S1201 as the print setting back-up 1001 in the logical printer 207. However, if the print setting back-up 1001 already exists, the print setting back-up 1001 is overwritten.

By executing the processing described above, when port is changed before printing, in particular, even when port is changed several times in succession, the situation in which only the default print settings 211 are gradually rounded can be avoided, whereby the same effects as those of the above-described first embodiment can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

This application claims the benefit of Japanese Patent Application No. 2009-021947 filed Feb. 2, 2009 which is hereby incorporated by reference herein in its entirety.

What is claimed is:

1. A non-transitory storage medium for storing a program that switches a plurality of printing apparatuses by changing a port of a logical printer for printout and is executed by a computer having a storage unit configured to associate the port with device settings for storing it, the storage medium storing the program for the functioning of the computer comprising:
   a reflecting unit configured to acquire the stored device settings corresponding to the changed port to reflect the stored device settings in the device settings held by the logical printer if the port is changed; and
   a changing unit configured to change print settings so as not to be inconsistent with the device settings to be reflected by the reflecting unit,
   wherein the reflecting unit acquires the device settings from a changed printing apparatus if the stored device settings corresponding to the changed port cannot be acquired by the storage unit.

2. The non-transitory storage medium according to claim 1, wherein the reflecting unit acquires default print settings if the stored device settings corresponding to the changed port cannot be acquired by the storage unit and the device settings cannot be acquired from the changed printing apparatus.

3. An apparatus that switches a plurality of printing apparatuses by changing a port of a logical printer for printout, the apparatus comprising:
   a storage unit configured to associate the port with device settings for storing it;
   a reflecting unit configured to, if the port of the logical printer is changed, acquire the stored device settings corresponding to the changed port by the storage unit so as to reflect them in the device settings held by the logical printer; and
   a changing unit configured to change print settings so as not to be inconsistent with the device settings to be reflected by the reflecting unit,
   wherein the reflecting unit acquires the device settings from a changed printing apparatus if the stored device settings corresponding to the changed port cannot be acquired by the storage unit.

4. A control method that switches a plurality of printing apparatuses by changing a port of a logical printer for printout and is executed by a computer having a storage unit configured to associate the port with device settings for storing it, the method comprising:
   acquiring the stored device settings corresponding to the changed port by the storage unit so as to reflect them in the device settings held by the logical printer if the port of the logical printer is changed; and
   changing print settings so as not to be inconsistent with the device settings to be reflected,
   wherein the device settings are acquired from a changed printing apparatus if the stored device settings corresponding to the changed port cannot be acquired by the storage unit.

5. The method according to claim 4, wherein default print settings are acquired if the stored device settings corresponding to the changed port cannot be acquired by a storage unit and the device settings cannot be acquired from a changed printing apparatus.

6. A non-transitory storage medium storing a computer-executable program of instructions for causing a computer to perform a method comprising:
   changing a port of a logical printer for printout;
   storing device settings of the port;
   acquiring the stored device settings corresponding to changed port to reflect the device settings held by the logical printer if the port is changed; and
   changing print settings so as not to be inconsistent with the device settings to be reflected,
   wherein the device settings are acquired from the changed printing apparatus if the stored device settings corresponding to the changed port cannot be acquired by a storage unit.

7. The non-transitory storage medium according to claim 6, wherein default print settings are acquired if the stored device settings corresponding to the changed port cannot be acquired by a storage unit and the device settings cannot be acquired from a changed printing apparatus.

* * * * *